No. 637,026. Patented Nov. 14, 1899.
I. S. PERKINS.
COMBINED PLOW AND PLANTER.
(Application filed Sept. 14, 1899.)

(No Model.) 2 Sheets—Sheet 1.

Witnesses
D. W. Edelin.
A. B. Griffith.

Inventor
Ivan S. Perkins
By Eugene W. Johnson
Attorney

THE NORRIS PETERS CO., PHOTO-LITHO., WASHINGTON, D. C.

No. 637,026. Patented Nov. 14, 1899.
I. S. PERKINS.
COMBINED PLOW AND PLANTER.
(Application filed Sept. 14, 1899.)
(No Model.) 2 Sheets—Sheet 2.
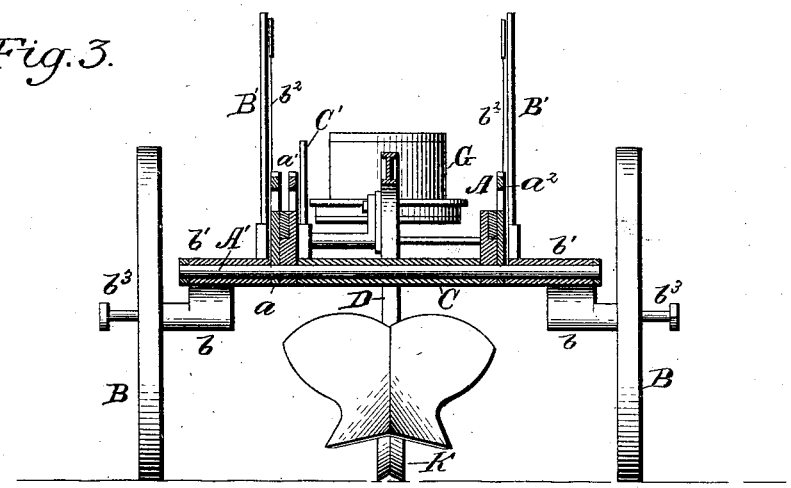
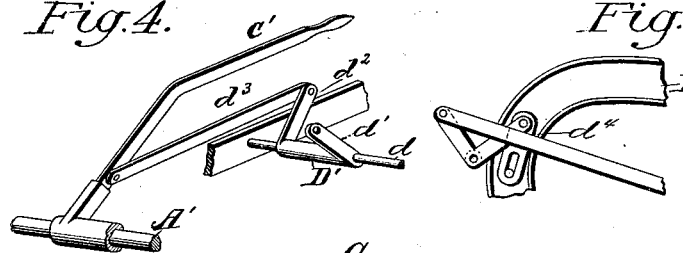
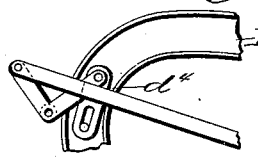
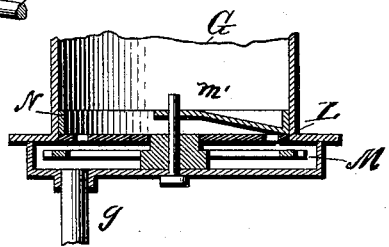
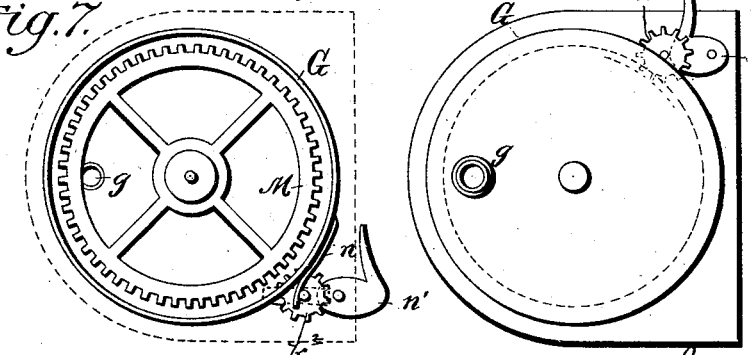
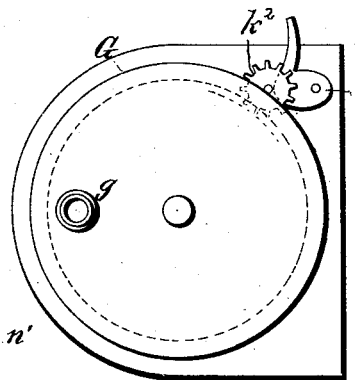
Witnesses
D. W. Edelin.
A. B. Griffith
Inventor
Ivan S. Perkins
by Eugene W. Johnson
Attorney
THE NORRIS PETERS CO., PHOTO-LITHO., WASHINGTON, D. C.

UNITED STATES PATENT OFFICE.

IVAN S. PERKINS, OF FRANKFORT, KANSAS.

COMBINED PLOW AND PLANTER.

SPECIFICATION forming part of Letters Patent No. 637,026, dated November 14, 1899.

Application filed September 14, 1899. Serial No. 730,473. (No model.)

*To all whom it may concern:*

Be it known that I, IVAN S. PERKINS, a citizen of the United States, residing at Frankfort, in the county of Marshall and State of Kansas, have invented new and useful Improvements in a Combined Plow and Planter, of which the following is a specification.

This invention relates to certain new and useful improvements in wheel listers and seed planters or drills, the object of the invention being to provide a seating attachment for lister or double-shovel plows which is pivotally connected to the main frame, the seating attachment having a supporting or covering wheel which is connected with the seating mechanism and assists in supporting the frame to provide a three-wheel riding lister and planter in which the seed-dropping mechanism is actuated from the rear or covering wheel.

Figure 1:
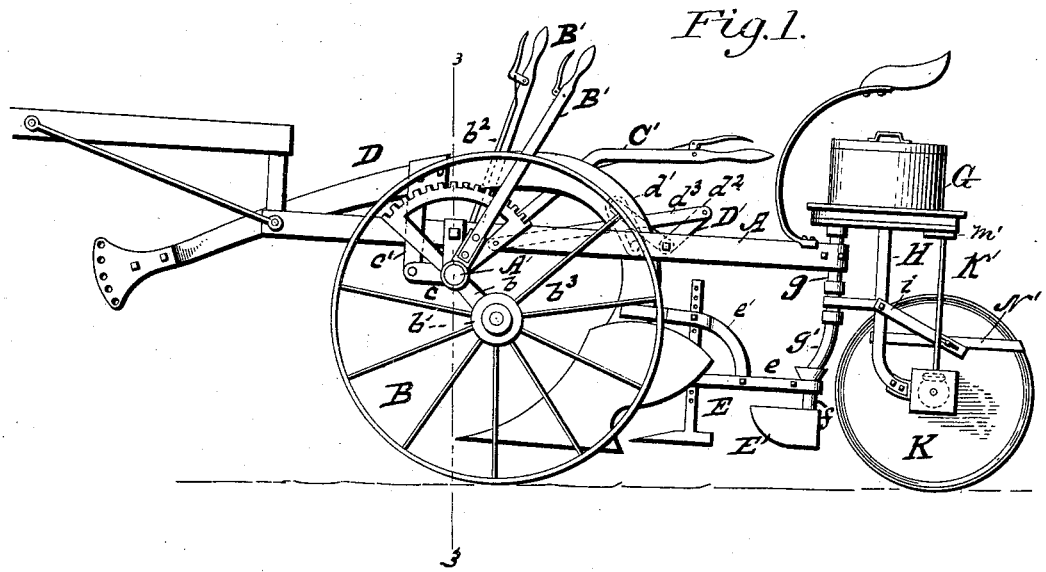
Figure 2:
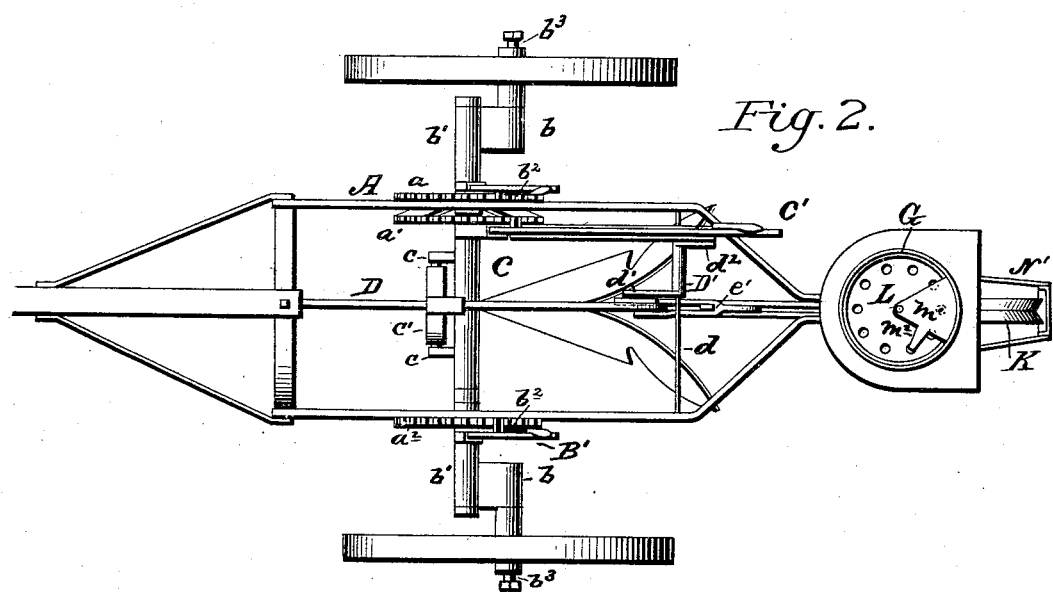

In the drawings, Figure 1 is a side elevation of the combined lister and planter or seed-drill. Fig. 2 is a plan view. Fig. 3 is a transverse section taken on the line 3 3 of Fig. 1. Fig. 4 is a detail perspective view showing the lever and means connected thereto for raising and lowering the plow-beam. Fig. 5 is a detail view, the same being a part of the mechanism connected to the plow-beam and lever. Fig. 6 is a vertical section taken through the center of the seedbox. Fig. 7 is a plan view of the lower portion of the seedbox. Fig. 8 is an inverted plan view of the seedbox, and Fig. 9 a vertical sectional view of the covering-wheel.

The main frame A has rigidly bolted thereto segment-racks $a, a'$, and $a^2$, the arched portions having teeth and portions which extend below the frame, having openings for the passage therethrough of a bar or axle $A'$. Upon the ends of the bar or axle there are mounted crank portions $b$, which carry at one end spindles for the hubs of the wheels B B and at the other ends sleeves $b'$, through which passes the axle $A'$. The sleeves $b'$ have formed thereon sockets or lugs for the reception of levers $B'$, said levers having the usual hand grips and rods $b^2$, which are connected to pawls which engage with the teeth of the segmental rack, so that by adjusting the levers the wheels B may be raised or lowered.

The spindles $b^3$, carried by the cranks or fixtures, are of a greater length than the hubs or skeins of the wheels, so that the wheels may have a lateral movement upon the spindles, so that the wheels will adjust themselves to run in furrows, thus providing means whereby the wheels will adjust themselves to any irregularity of the furrows.

Between the side pieces of the main frame upon the axle is a sleeve or fixture C, to which a lever $C'$ is attached, the pawl or bolt carried by said lever being on a line with the segmental rack $a'$. The sleeve C has forwardly-projecting lugs $c$ $c$, to which is connected an arched bar $c'$, said bar being attached to the plow-beam by any suitable coupling. Rear of the axle the sides of the main frame A are connected by a cross-bar $d$, upon which is mounted a bell-crank lever $D'$, the arms $d'$ $d^2$ projecting at an angle of about forty-five degrees from each other. The arm $d^2$ is connected by a bar $d^3$ to the lever $C'$, and the other arm $d'$ is pivotally connected to a plate $d^4$, which engages with a bolt carried by the plow-beam. By providing a slotted plate, as shown, the plow-beam and parts attached thereto may have a vertical movement independent of the adjustment of the lever, and said vertical movement is limited by the length of the slot.

The draft-pole is attached to an arch which is connected to the forward ends of the side bars of the frame A, and braces extend from the pole to the ends of the frame. The draft-animals are hitched in the usual manner to the plow-beam, and the depth which the plow will enter the soil can be regulated by the levers $B'$, by means of which the main adjustments are made as to the height of the frame from the ground, and for operating on a hillside the particular or minor adjustment of the plow can be made by the lever $C'$, and said lever is employed to set the plow to suit different conditions of soil and to vary the inclination of the plow-point.

The driver's seat is attached to the rear portion of the frame A, and in operating the levers they are drawn upon to raise the frame or depress the plow. This arrangement I consider desirable, as the operator can exert with less effort greater power by pulling on the levers than by pushing them forward, and when the pawls are released from the racks the tendency of the levers is to move forward.

The beam D has attached thereto an ordinary double-shovel plow or lister cultivator, and to the plow-beam so as to extend rearward are bars $e\ e'$, to which is connected a vertically-adjustable standard, which has at its lower end a furrow-opener or subsoil plow, the same being in advance of a runner or drill E', which is connected to the rear end of the bar $e$ by a tube $f$, into the upper end of which is passed the lower end of a flexible section $g$, which forms a part of the seed-spout.

The rear portion of the main frame A converges and is formed into an eye, which encircles a tube $g$, which is rigidly connected and depends from the under side of the seedbox G, and the seed passes through said tube and is guided by the flexible section $g'$ and rigid section $f$ in rear of the runners E'. The tube $g$ may turn in the eye or bearing at the rear end of the main frame and serves to connect the seedbox and parts carried thereby pivotally to the main frame.

Figure 9:
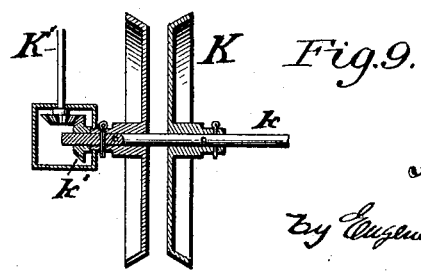

Centrally to the under side of the seedbox are attached depending arms H, the lower ends of which extend rearward, one of the arms carrying a gear-casing having therein a bearing for a shaft $k$, the opposite end of the shaft being supported by the other arm. Upon the shaft $k$ is a covering-wheel K, made in two parts, each part being adjustably secured to the shaft by means of cotter-pins which pass through the hubs and apertures in the shaft. When the disks or parts of the covering-wheel K are positioned on the shaft so that they will abut, said wheel will operate as an ordinary covering-wheel, but when the two sections thereof are separated, as shown in Fig. 9, the inclined or diverging rims will press the ground toward the seed, which is dropped by the drill in front of the wheel. Upon the shaft $k$, to be located within the gear-casing, is a pinion $k'$, which meshes with a pinion mounted on the lower end of a shaft K', which is supported near one end by the gear-casing, the other end engaging with a slide attached to or seated in a slot in the seedbox, and said shaft or block is engaged by a spring $n$, the normal tendency of which is to hold the gear-wheel $k^2$ out of mesh with the toothed wheel M, which is positioned within the seedbox, and to the seedbox is attached a cam $n'$, which when properly set holds the gear-wheel $k^2$ in engagement with the toothed wheel M. The gear-wheel M is mounted within the seedbox upon a centrally-projecting pin, and the hub of said wheel carries a stud or other suitable means for connecting to move in unison therewith a disk L, having peripheral openings which are on a line with the tube $g$. Within the seedbox is secured a ring N, which bears upon the disk L and holds the same in place, and this ring carries a segment $m'$, which lies over several of the openings in the disk L, and said segment has a tongue or projecting portion $m^2$ in line with the apertures in the disk to wipe the same, so that the proper amount of seed will be carried to the drill.

A scraper N', for the purpose of removing the soil from the rim of the covering-wheel, is attached to the standards H and is braced thereto by rods $i$.

It will be noted that the seedbox is connected to the main frame so that it may turn on the tube $g$ and that the covering-wheel is attached to the seedbox to follow the line of draft, said covering-wheel supporting the full quota of weight, so that the earth will be packed over or about the seed. When the plow-beam is raised, the flexible tube $g'$ of the seed-spout will enter the tube $f$ and slide therein, so that the raising or lowering of the plow-beam or the main supporting-wheels will not disconnect the seedbox from the drill.

Having thus described my invention, what I claim as new, and desire to secure by Letters Patent, is—

1. The combination in a lister, of a frame, the rear portion of which converges and is formed into an eye or vertical bearing, a tube which passes through said eye so as to project above and below the frame, a plow-beam carried by the frame and provided with a plow, subsoiler and seed-drill, a connection between the tube and drill, a seedbox having at its forward portion an aperture on a line with the tube, arms which depend from the under side of the seedbox in rear of the tube, the ends of said arms extending rearward, a covering-wheel carried by the arms, a vertical shaft having gear-wheels, the lower gear-wheel engaging a gear-wheel on the shaft of the covering-wheels and the upper one with the seed-dropping mechanism, substantially as shown and for the purpose set forth.

2. In combination with the main frame having segmental racks and depending portions which extend therefrom beneath the frame and are apertured, a shaft or axle carried by said depending portions, fixtures mounted on the axle and provided out of line therewith with spindles, wheels mounted on the spindles and levers attached to the turning fixture, substantially as shown whereby the supporting-wheels may be raised or lowered.

3. In a lister plow or cultivator, the combination with a shaft or axle, a sleeve through which the axle passes, said sleeve having forward-projecting lugs, an arched bar pivotally connected to the lugs and rigidly to the beam of the cultivator, a hand-lever in rigid engagement with the sleeve, a rack carried by the main frame in line with the locking-pawl of the hand-lever, a bell-crank lever carried by the main frame in rear of the axle and sleeve, a bar which connects one of the arms of the bell-crank lever with the hand-lever, and a slotted plate connected to the other arm of the bell-crank lever and to the cultivator-beam.

4. In combination with a plow or cultivator beam, means for connecting the same to a wheel-supported frame, said means including a pivotally-supported sleeve to which a hand-lever is attached and means for engaging the forward portion of the beam, a bell-crank lever attached to the main frame, one of the arms thereof being connected to the hand-lever and the other to the rear portion of the beam, substantially as shown.

5. The combination with a pair of rocking bars, as C and D', a rod connecting the rocking bars so that the forward projecting members thereof may be raised or lowered in unison, means for connecting said members to a cultivator or plow beam, the means connecting the rear locking-bar to the beam including a slotted plate, substantially as shown and for the purpose set forth.

In testimony whereof I have hereunto set my hand in presence of two subscribing witnesses.

IVAN S. PERKINS.

Witnesses:
L. V. McKEE,
P. R. WOLFE.